Figure 1:
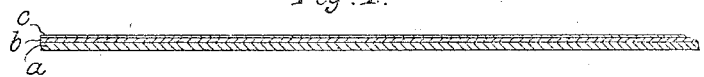

J. RHEINBERG.
SCREEN FOR COLOR PHOTOGRAPHY AND GENERAL PHOTOGRAPHIC PURPOSES.
APPLICATION FILED MAR. 16, 1915.

1,161,731. Patented Nov. 23, 1915.

Witnesses
Norris L. Sumby.

Inventor
Julius Rheinberg
by
Attorney

UNITED STATES PATENT OFFICE.

JULIUS RHEINBERG, OF LONDON, ENGLAND.

SCREEN FOR COLOR PHOTOGRAPHY AND GENERAL PHOTOGRAPHIC PURPOSES.

1,161,731.  Specification of Letters Patent.  Patented Nov. 23, 1915.

Application filed March 18, 1915. Serial No. 14,842.

*To all whom it may concern:*

Be it known that I, JULIUS RHEINBERG, a subject of the King of Great Britain, residing at London, England, have invented new and useful Improvements Relating to Screens for Color Photography and General Photographic Purposes, of which the following is a specification.

This invention relates to improvements in the manufacture of screen plates for color photography and general photographic purposes.

So far as multicolor screen plates are concerned, it applies to those of the kind in which the different colors are all formed in a single film of a colloid such as collodion or gelatin, without any part of the film being removed or washed away in the process. Such films may be on glass, celluloid, paper or other foundations.

Where the screen is in one color only, as is usually the case with line and dot screens such as are used in reproduction processes for half-tone, photogravures and other general photographic purposes, the same applies.

In the production of color screen plates hitherto the film is either caused to absorb dyes of a particular color, in the spaces apportioned to that color, usually in the shape of regularly recurrent dots or lines, or dye is extracted from an already dyed film in the shape of dots or lines. In either case during that operation it has been found necessary to protect selected parts of the film, viz: those dots lines or parts of the film which are not to be acted upon, with a temporary or permanent resist of some other substance than that of which the film is composed, such as greasy inks, varnishes, rubber in suitable solvents, gelatin, etc. Either no resist is applied to those parts which are to be acted upon by extracting the dye, or which are themselves to act by absorbing the dye; or alternatively the whole vehicle of the resist is just washed away or dissolved away from those parts.

Before proceeding, I wish to define the use of the word "resist". Resist used in photographic processes may be of two kinds, viz: those which are not affected by exposure to light, such as greasy inks, varnishes, etc., and those which are affected for instance gelatin or other colloids impregnated with other substances, for example with potassium bichromate. In the latter case there is the substance, medium or vehicle of the resist together with a sensitizer or sensitizing medium, and actually the two together form the resist. No distinction has hitherto been made in photographic literature, and the word "resist" is very often used to denote the vehicle substance or medium of the resist alone; it is usual for instance to speak of a gelatin resist, an albumen resist, an "unsensitized" resist, etc.

I shall in what follows frequently make use of the terms, vehicle, substance or medium of the resist, in place of using the word "resist" by itself, for the sake of greater clearness.

Figure 2:
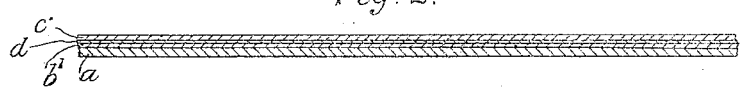
Figure 3:
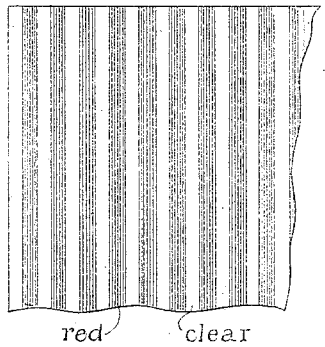
Figure 4:
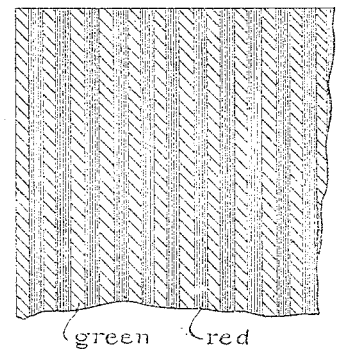
Figure 6:
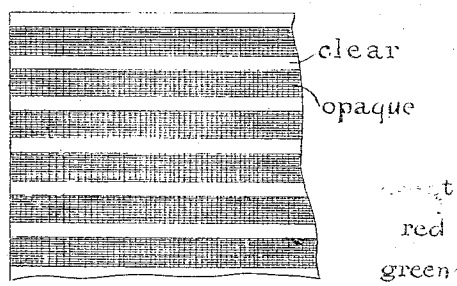
Figure 5:
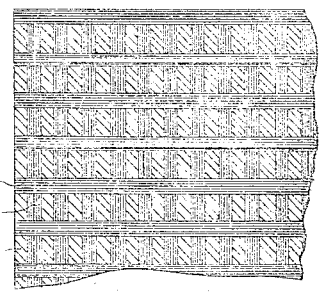

In the accompanying drawing Figures 1 and 2 are transverse sections showing to an enlarged scale two forms of my improved multicolor screen in process of manufacture. Figs. 3, 4 and 5 are enlarged plan views of a portion of a multicolor screen, showing three stages in its manufacture. Fig. 6 is a plan of a line screen used in the manufacture of my improved multicolor screen.

Now according to my invention I cover the whole film with the vehicle of my resist, I cause chemical changes to occur in the resist by the action of light, which alter its permeability to solvents, and then proceed to extract the dyes from the underlying film in the manner desired, without any removal of the superimposed resist. Moreover, the resist may in some cases be composed of similar substance to that of the underlying film.

For the substance or vehicle of the resist I use any suitable colloid, for example gelatin, albumen, casein, collodion or other nitrocellulose.

The colloid is made sensitive to light by means of any salts or mixture of salts which are known to confer this property upon them, but preferably I use salts of iron, with or without the addition of salts of uranium. The sensitizing may be effected by immersion of the plate in the sensitizing solution after coating the film with the colloid, or the iron or other salts may be added to the colloidal solution before coating the films with same.

The colloid or mixture of colloids which I use for the resist depends upon the colloid or mixture of colloids used for the underlying films, which acts as the vehicle for the color dyes or pigments. The governing condition is that both must be permeable to the solvent used for extracting the colors from the underlying film through the upper film, or dyeing up the underlying film through the upper one. By way of example I mention a collodion film as the vehicle for the colors and an albumen resist, both of which are permeable for example to alcohol, to which small amounts of inorganic acids have been added, as shown in Fig. 1, where $a$ is a glass plate forming the foundation, $b$ the collodion screen film, and $c$ the albumen resist film.

I do not necessarily bring any light-sensitive resist into immediate contact with the film containing the dyes, for I may if desired interpose one or more intermediate films permeable to the action of the solvents used for extracting the colors. This is desirable for instance when I use the same colloid for the resist as for the color screen itself, in which case intermediate layers prevent or lessen any chance of the dye or dyes in the color screen running while the resist is being put on, for example where the main film and the resist are both of collodion, an albumen film may be interposed, as shown in Fig. 2, where $a$ is the foundation, $b'$ the collodion color screen film, $d$ the intermediate albumen film, and $c'$ the collodion resist film.

With respect to the sensitizing salts for the resist, I preferably make use of a salt or a mixture of salts which change in respect of their solubility in the solvent to be employed for extracting the dye, after exposure employed to start with, but may become soluble or much more soluble than previously after exposure to light. Or vice versa the salt may be soluble or fairly soluble in the solvent to be employed to start with, and may become insoluble or nearly insoluble after exposure to light. It is by this means that the permeability of the resist to the solvent is changed. The changes may occur through chemical interaction of the sensitizer with the medium of the resist, as in the familiar instance of gelatin sensitized with potassium bichromate, or the medium of the resist may remain more or less unchanged and the change of solubility occur mostly if not entirely in the salt or mixture of salts themselves.

By way of concrete example, if I use collodion as the vehicle for the color screen, albumen as the medium of the resist, and extract dyes from the collodion through the albumen resist by means of acidified alcohol, then I prefer to use a mixture of a salt of iron like ferric ammonium citrate in conjunction with a uranium salt like uranium nitrate. Ferric ammonium citrate is practically insoluble in ordinary alcohol, but I have found that when the albumen resist is sensitized with this salt together with uranium nitrate, the mixture of salts becomes soluble in acidified alcohol after exposure to light.

The solvents used for extracting the dyes or pigments from the underlying film through the upper one, or for introducing dyes or pigments into the underlying film through the upper one, will vary according to the colloid or mixture of colloids employed for these films; it has already been pointed out that these films must be permeable to the same solvent. If the color screen is to be in a gelatin film, and the resist vehicle composed of albumen, then generally speaking water is employed as the solvent, or water with the addition of other chemicals. If collodion is the medium of the underlying film, and the resist is composed of albumen, then alcohol or methylated spirit is the solvent which I prefer. To obtain more rapid and powerful action, I may add to this a proportion of ether, amyl acetate, acetone methyl alcohol or similar reagents.

Taking by way of example the case of a collodion film, dyed red, with an albumen resist sensitized with the mixture of ferric ammonium citrate and uranium nitrate, if this is exposed to light under a line or dot screen having clear and opaque elements, and then submitted to the action of acidified alcohol, the dye will be entirely or almost entirely extracted from those parts of the film which have been acted on by the light, so that the parts of the collodion film corresponding to the clear parts of the line or dot screen become clear, while the parts corresponding to the opaque parts of the line or dot screen remain unaltered.

Just as dyes or colors may be extracted from the film in the manner above described, so a film wholly or partly free from dyes, covered with the light-sensitive resist, after exposure to light under a line or dot screen, may be caused to selectively absorb colors in parts when immersed in a solution containing the dye, or when brought into contact with the medium containing the dyestuffs.

I will now give an example of producing a multicolor screen by the methods in question. Such multicolor screens may be made in any number of colors, and the configuration of the color elements may be in any pattern, regular or irregular, but the example I propose to deal with is a screen in three colors, red, green and violet respectively, in which the red and green elements are in the shape of rectangular dots and the violet elements in lines, each of the three colors occupying an equal area of the whole surface.

1. I coat a plate with collodion dyed red, and having an albumen resist on same, which I sensitize by immersion in water containing 7½% of green ferric ammonium citrate and 7½% uranium nitrate.

2. I expose the plate to light under a line screen having say 200 opaque lines and 200 clear lines per inch, the opaque and the clear lines being of equal width.

3. I immerse the plate in acidified alcohol and extract the red dye from the parts of the collodion film corresponding to the clear lines, through the albumen resist. The plate will now have 200 red lines and 200 clear lines per inch, as shown in Fig. 3.

4. I next immerse the plate for a short while in an alcoholic solution of a green dye, by which means the clear lines of collodion become green, the red lines remaining as they were (see Fig. 4.) The green and red dyed portions now occupy half the total area of the plate each.

5. I next wash the plate in a stream of water thereby removing the resist.

6. I coat the plate with a fresh albumen resist, and sensitize same as before.

7. I expose the plate to light under a line screen having 200 opaque and 200 clear lines per inch, the opaque lines being twice as wide as the clear ones (see Fig. 6). The line screen is placed at right angles to the red and green lines already on the plate, during exposure.

8. I again immerse the plate in the acidified alcohol solution and extract the dyes from the collodion film corresponding to the clear lines of the line screen, through the albumen resist. This will leave the plate with red and green rectangular elements and with clear lines. The clear lines will occupy one third the area of the plate, as they were only half the width of the opaque lines in the line screen. Consequently the red and green rectangles left in the collodion occupy two thirds of the area of the plate conjointly, or one third of its area each.

9. I immerse the plate for a short while in an alcoholic solution of a violet dye, thereby dyeing up the clear lines and leaving the red and green rectangles unaffected, as shown in Fig. 5.

10. I now remove the resist by washing in a stream of water, leaving the film containing the color elements clean and free.

The multicolor screen is now complete, but it may be covered with a layer of hardened gelatin or other material to protect the surface, if desired, or where necessary it may be coated with a film and sensitized, or coated with a sensitive mixture or emulsion in the ordinary way. Such additional layer or film may be represented by the film lettered c in Fig. 1, the letter b now representing the screen film, and a the support or foundation.

In place of washing away the first resist as in operation (5), it is sometimes desirable to merely remove the salts and coloring matter from same, which can be done by gentle immersion in water. The same resist can then be re-sensitized afresh, and subsequent operations proceeded with.

By changing the colloids used for the color screen and for the resist, or by changing the sensitizers, or by changing the patterns of the color elements and so forth, an innumerable number of variations in the process of making the color screen can be made; the feature common to all, which is the essential feature of this invention, being that the dyes or pigments are extracted from or put into the colloid which is to form the color screen through the superimposed colloidal resist film, without the substance of this film being removed while extraction of the dye from the film below or absorption of the dye is taking place.

As regards screens in one color only, as usually employed for the line and dot screens used in reproduction processes for half-tone, photogravures and other photographic processes, the stages 1, 2 and 3 of the description for producing multicolor screens sufficiently clearly indicate how these may be made. Fig. 3 may be considered as an example of such a screen.

Instead of starting with a colored film and extracting the color through the resist in order to produce the clear lines or dots as the case may be, I may start with an uncolored film, and dye this up through the resist in dots or lines.

Multicolor screens made according to this process have a double advantage, viz: that their surface is absolutely clean and free from all traces of any insoluble matter adhering to the color elements and secondly that all screens made from the same pattern plates will register precisely so that registerable screens can be produced in unlimited numbers. For certain processes of color photography these two qualifications in combination are essential. As an instance may be mentioned British Patent No. 22,938, October 10, 1913, to Julius and Ernest Rheinberg and the application for U. S. Patent Serial No. 859,502, filed August 31, 1914, by Julius and Ernest Rheinberg, in which a multicolor screen provided with a sensitive emulsion casting is exposed to light in register with a transparency which has been made by the aid of a multicolor screen of similar pattern, after which the dyes are extracted from the multicolor screen by a suitable solvent in proportion to the exposure to light. Adherent insoluble matter would in this case offer obstacles to and prevent the dyes being extracted regularly.

The methods by which screen plates have been manufactured hitherto, have not permitted of the double advantage above referred to, although there are several processes of manufacture by which either one or the other have been obtained.

Multicolor screens made by my process are readily distinguishable by their absolutely smooth surface which yields mirror-like reflections.

I claim:

1. In the manufacture of screens for photographic purposes, applying a colloid film to a suitable foundation, applying to the surface of said colloid film a light-sensitive resist, the vehicle of which completely covers the aforesaid film, bringing a pattern screen into contact with said resist, exposing said resist to light through said pattern screen, and alternately and selectively extracting dye from and dyeing up said film through the substance of the superimposed resist.

2. In the manufacture of screens for photographic purposes, applying a colloid film to a suitable foundation, applying to the surface of said colloid film a light-sensitive resist, the vehicle of which completely covers the aforesaid film, bringing a pattern screen into contact with said resist, exposing said resist to light through said pattern screen, and selectively extracting dye from said film through the substance of the superimposed resist.

3. In the manufacture of screens for photographic purposes, applying a colloid film to a suitable foundation, applying to the surface of said colloid film a resist consisting of a second colloid film, which completely covers the first film and which contains salts the degree of permeability of which to dye solution is changed by exposure to light bringing a pattern screen into contact with said resist, exposing said resist to light through said pattern screen, and selectively transferring dye in solution through the substance of said resist film.

4. In the manufacture of screens for photographic purposes, applying to a suitable foundation a collodion film, applying to the whole of the surface of the collodion film a colloid film which acts as a resist and which contains iron and uranium salts that cause its permeability by an alcoholic dye solvent to be changed by exposure to light bringing a pattern screen into contact with said resist, exposing said resist to light through said pattern screen, and selectively transferring dye in solution through the substance of said resist.

5. In the manufacture of screens for photographic purposes, applying a colloid film to a suitable foundation, applying to the surface of said colloid film a resist consisting of a second colloid film, which completely covers the first film and which contains salts the degree of permeability of which to dye solution is changed by exposure to light bringing a pattern screen into contact with said resist, exposing said resist to light through said pattern screen, selectively transferring dye in solution through the substance of said resist film, and then removing said resist film.

6. A multicolor screen consisting of a foundation and a colloid screen film containing the color elements, said elements being capable of registering exactly with those of other screens made by the same process and the screen having at the same time a mirror-like surface free from any adherent matter that is insoluble in water or alcohol.

7. A multicolor screen consisting of a foundation and a collodion screen film containing the color elements, said elements being capable of registering exactly with those of other screens made by the same process and the screen having at the same time a mirror-like surface free from any adherent matter that is insoluble in water or alcohol, and a second film superposed on said screen film.

JULIUS RHEINBERG.

Witnesses:
H. D. JAMESON,
A. NUTTING.